United States Patent [19]

Bishop, III

[11] 4,259,213

[45] Mar. 31, 1981

[54] HIGH COPPER LEVEL COMULLED AND IMPREGNATED SULFUR SORBENT

[75] Inventor: Keith C. Bishop, III, San Rafael, Calif.

[73] Assignee: Chevron Research Company, San Francisco, Calif.

[21] Appl. No.: 59,940

[22] Filed: Jul. 23, 1979

[51] Int. Cl.$^3$ ..................... B01J 21/04; B01J 23/72
[52] U.S. Cl. ..................................................... 252/463
[58] Field of Search ................. 252/463; 423/244, 628

[56] References Cited

U.S. PATENT DOCUMENTS

| | | | |
|---|---|---|---|
| 2,768,932 | 10/1956 | Richard et al. | 208/246 X |
| 2,897,142 | 7/1959 | Jacobs et al. | 208/212 |
| 3,403,111 | 9/1968 | Colgan et al. | 252/463 X |
| 3,776,854 | 12/1973 | Dautzenberg et al. | 252/463 X |
| 3,894,963 | 7/1975 | Gerdes et al. | 252/463 X |

*Primary Examiner*—W. J. Shine
*Attorney, Agent, or Firm*—D. A. Newell; W. H. Hooper; R. H. Evans

[57] ABSTRACT

A porous sulfur sorbent is disclosed which has principal use in desulfurizing reformer feedstreams. The sorbent is prepared by peptizing alumina with acid and mulling the peptized alumina with a copper compound to form an extrudable dough. The dough is extruded, dried and impregnated with additional copper. The resulting sorbent has a higher capacity for adsorbing sulfur compounds than conventional prior art materials.

4 Claims, No Drawings

HIGH COPPER LEVEL COMULLED AND IMPREGNATED SULFUR SORBENT

FIELD OF INVENTION

An improved sulfur sorbent is disclosed which has principal application in eliminating residual sulfur from conventionally desulfurized reformer or isomerization feed streams. More particularly, a novel sulfur sorbent is disclosed which has a high copper content and which is prepared by comulling and impregnating an alumina support with copper.

PRIOR ART

Catalytic reforming processes play an integral role in upgrading straight-run or cracked naphtha feedstocks. These processes have become particularly important in recent years due to increased demand for low-lead and unleaded gasolines.

In a typical modern reforming process, a straight-run or cracked naphtha feed, having a boiling range from about 20°–290° C., preferably 65°–235° C., is passed over a promoted noble metal catalyst on alumina at a temperature in the range of 315°–595° C., preferably 370°–565° C., a pressure in the range from atmospheric to 70 atmospheres, at a liquid hourly space velocity in the range 0.1–10, preferably 1–5, and a hydrogen to hydrocarbon mol ratio in the range 1–10. Variations in the conditions will depend in large measure upon the type of feed processed, such as whether the feed is aromatic, paraffinic or naphthenic, and the desired increase in octane levels. (See U.S. Pat. No. 4,082,697).

To achieve maximum run lengths and increased process efficiency, it is generally recognized that the sulfur content of the feedstock must be minimized to prevent poisoning of the catalyst. Preferably the feed will contain less than 2–10 parts per million by weight sulfur, since the presence of sulfur in the feed decreases the activity and the stability of the catalyst (see U.S. Pat. No. 3,415,737).

The hydrodesulfurization process is a common method of treating reformer feeds to reduce sulfur content, wherein the naphtha is contacted with a sulfur-resistant hydrogenation catalyst in the presence of hydrogen. Catalysts for this service normally comprise Group VIB and/or Group VIII metals on refractory supports, such as molybdenum and cobalt metals, their oxides or sulfides, on alumina. The sulfur in the feed stream is converted to hydrogen sulfide, which may be separated from the naphtha by conventional means prior to reforming. Although good sulfur removal may be achieved by hydrodesulfurization units operating under severe conditions, the process is ultimately limited by the physical and chemical equilibrium concentration of hydrogen sulfide and mercaptans in the treated liquid feed.

If as little as 1.5 parts per million by weight of $H_2S$ remain in the reformer recycle hydrogen stream, the run length will be decreased by as much as 50%, $C_5+$ yields will be decreased by 1.5 liquid volume percent, and hydrogen yields decreased accordingly. Thus, there exists a very strong economic incentive to remove substantially all sulfur from the reformer feed stream.

The prior art teaches that various metals and particularly those of Group IB, such as copper and silver, may be used for the desulfurization of naphtha feed streams. For example, W. L. Jacobs in U.S. Pat. No. 2,897,142, which is incorporated herein by reference, discloses that a bed of copper pellets may be placed after a conventional hydrodesulfurization unit to reduce sulfur levels in naphthas. The prior art also teaches in U.S. Pat. No. 3,776,854, which is incorporated herein by reference, that sulfur oxides may be removed from waste gases with an acceptor prepared by impregnating an alumina support with a copper compound. See also U.S. Pat. No. 2,768,932.

In order to impregnate copper into a preformed support, it is usually necessary to start with a soluble copper salt, such as copper nitrate or copper sulfate. The salt is dissolved in an aqueous medium and the support carrier immersed therein. The metals content which can be impregnated upon the support, however, is economically limited to approximately 14% by weight, since further increases in copper loading do not result in a proportional beneficial effect.

U.S. application Ser. No. 17,782, filed Mar. 5, 1979, incorporated herein by reference, discloses a sulfur sorbent which is prepared by peptizing an alumina with an acid such as hydrochloric acid, nitric acid, formic acid, acetic acid or propionic acid; mulling the peptized alumina with a copper compound to form an extrudable dough; extruding the dough; and drying and calcining the extrudate. The copper compound selected may comprise copper nitrate, copper oxide, copper chloride, or copper chromite, and preferably comprises copper carbonate. Sufficient amounts of the copper compound are preferably added to the peptized alumina such that the final extrudate will have a copper content, based upon the metal, in excess of 14 weight percent.

A new copper sorbent has been discovered, however, which has a higher sulfur capacity than the sorbents of the prior art without sacrificing the high activity required for a viable commercial sorbent.

SUMMARY OF THE INVENTION

The present invention relates to a novel sulfur sorbent which is prepared by peptizing an alumina, preferably an alpha alumina monohydrate, with an acid such as hydrochloric acid, nitric acid, formic acid, acetic acid or propionic acid; mulling the peptized alumina with a copper compound to form an extrudable dough; extruding the dough; drying and calcining the extrudate; impregnating the calcined extrudate with an aqueous copper solution and drying and calcining the impregnated extrudate. The copper compound mulled with the peptized alumina may comprise copper nitrate, copper oxide, copper chloride or copper chromite, and preferably comprises copper carbonate. Sufficient amounts of the copper compound are preferably added to the peptized alumina such that the extrudate will have a copper content, based upon the metal in excess of 14 weight percent. The pore volume of the sorbent ranges from about 0.4 to 0.9 cubic centimeters per gram and at least 75% of the pore volume comprises pores having a diameter between 40 and 200 Angstroms. Preferably at least 85% of said pore volume will be inside said diameter range. At least 0.5 weight percent and preferably at least 1.0 weight percent of the total copper in the sorbent compound is added by the impregnation step.

DETAILED DESCRIPTION OF THE PREFERRED EMBODIMENTS

The present invention relates to an improved high-capacity sulfur sorbent, which is particularly useful for removing residual quantities of sulfur from previously hydrodesulfurized and/or hydrocracked reformer feed streams. The novel sorbent is prepared by acid peptizing alumina and comulling a copper compound therewith in effective quantities, extruding the comulled mixture, drying and calcining the extrudate, and impregnating the calcined extrudate in a aqueous copper solution and drying and calcining the impregnated extrudate.

Hydrodesulfurization units typically will reduce sulfur content in high-sulfur feeds to about 1 to 5 parts per million. Residual sulfur levels of this magnitude, however, still have a deleterious effect on reformer run lengths between catalyst regeneration and thus increase the cost of transportation fuel production. The sorbent of the present invention may be used under moderate temperature and pressure conditions to eliminate the remaining sulfur, present as $H_2S$ or mercaptans. Since the sorbent of the present invention has a high capacity and will be used primarily for low-sulfur-content feeds, the sorbent may be produced on a disposable basis, thus eliminating costly regeneration equipment.

Sulfur loading or capacity appears to be proportional to copper levels in the sorbent up to about 14 weight percent copper. For example, the sulfur capacity of a 7-weight-percent impregnated sorbent is approximately one-half the capacity of a 14-weight-percent impregnated sorbent. Beyond 14 weight percent, however, additional impregnated copper gives less than the respective proportional capacity increase. In fact, 20% copper sorbents made by a single impregnation step were observed to actually have less capacity than 14-weight-percent impregnated copper sorbents. This anomaly is believed to result from copper deposits obstructing the alumina support pores.

Comulled sorbents made in accordance with the disclosure of U.S. patent application Ser. No. 17,782, however, are not limited to the 14-weight-percent copper levels of the single-step impregnated catalyst. Tests made thus far have shown that comulled copper sorbents having up to 36% copper by weight are proportionally capacitive to sorbents of lower copper content. Thus, comulled sorbents may be prepared which have capacities at least $2\frac{1}{2}$ times as great as impregnated sorbents.

Comulled copper sorbents and impregnated sorbents having less than 14-weight-percent proper normally exhibit a life of about 21 hours per weight percent copper. For purposes of testing, the sorbent was considered expended when 20% of the feed sulfur appeared in the effluent. A sorbent was prepared by comulling copper oxide into a peptized alumina, extruding the comulled mixture, drying and calcining at a temperature of approximately 500° C., and impregnating the calcined extrudate in a copper nitrate solution. The final sorbent had 14-weight-percent mulled copper and 2% impregnated copper. The sample sorbent should have a life of approximately 336 hours based upon previous observations; however, in actual testing a life of 435 hours was observed.

In this test, hydrofined naphtha, boiling in the range of about 80° C. to 200° C. and having a mercaptan sulfur content of approximately 20 parts per million by weight was passed over a bed of the copper sorbent described above at a pressure of 14.6 atmospheres, a temperature of approximately 166° C. and a liquid hourly space velocity of 5 per hour. Twenty percent sulfur breakthrough was observed after approximately 435 hours on stream. Thus, it is observed that the combined impregnated-comulled sorbents give an increased capacity of approximately 30% over the expected capacities.

The type of alumina used for the comulled catalyst base does not appear to be critical. Although the preferred support will be comprised primarily of alumina, the support may also contain other materials, such as silica, for example, to impart additional strength thereto. Various peptizing agents such as propionic acid, nitric acid, hydrochloric acid and sulfuric acid may be used, although nitric acid is preferred. Similarly, a number of copper compounds may be mulled with the peptized alumina such as copper oxide, copper nitrate and copper carbonate, although copper carbonate is preferred since the carbonate decomposes to the oxide upon calcination without releasing harmful atmospheric pollutants. The mixture of acid, alumina and copper compounds should have a volatiles content in the range of 50-60 weight percent, and preferably 54-56 weight percent, for good extrusion consistency. After extrusion, the extrudates are preferably dried at a temperature of 125° C. for 2 hours prior to calcining at 500° C. for 2 hours. The final temperature of calcination may vary, depending upon the type of copper compound used in the extrudate preparation.

Impregnation of the calcined extrudate with additional copper may be conducted by conventional techniques. Normally a soluble copper salt such as copper nitrate or copper sulphate is dissolved in an aqueous solution and the calcined extrudate is immersed therein for approximately 0.5 hours. After immersion the sorbent is dried and calcined at a temperature of 500° C. The drying step may be carried out in an inert, an oxidizing, or reducing atmosphere.

The pore volume of the comulled-impregnated sorbents range from about 0.4 to 0.9 cubic centimeters per gram. At least 75% and preferably 85% of the pore volume is comprised of pores having a diameter between 40 and 200 Angstroms as determined by mercury porosimetry techniques using a contact angle of 2.443461 radians and a mercury surface tension of 473 dyne/cm at 25° C.

What is claimed is:

1. A porous sulfur sorbent, prepared by the process which comprises:
    peptizing an alumina with acid; mulling the peptized alumina with a copper compound to form an extrudable dough; extruding the dough; drying and calcining the extrudate; impregnating the calcined extrudate with an aqueous solution of a copper compound and drying and calcining the impregnated extrudate.

2. A porous sulfur sorbent as recited in claim 1, wherein said acid is an acid selected from the group consisting of formic acid, nitric acid, acetic acid, propionic acid, and hydrochloric acid.

3. A porous sulfur sorbent as recited in claim 1, wherein said mulled copper compound is a copper compound selected from the group consisting of copper carbonate, copper oxide, and copper nitrate.

4. A porous sulfur sorbent as recited in claim 1, wherein said alumina is predominantly comprised of an alpha alumina monohydrate.

* * * * *